Dec. 18, 1956 D. C. LIVINGSTON 2,774,813

ELECTROLUMINESCENT TELEVISION PANEL

Filed Nov. 1, 1955 2 Sheets-Sheet 1

INVENTOR.
DONALD C. LIVINGSTON
BY Theodore Jay Jr.
ATTORNEY

Dec. 18, 1956 D. C. LIVINGSTON 2,774,813

ELECTROLUMINESCENT TELEVISION PANEL

Filed Nov. 1, 1955 2 Sheets-Sheet 2

INVENTOR.
DONALD C. LIVINGSTON
BY
[signature]
ATTORNEY

United States Patent Office
2,774,813
Patented Dec. 18, 1956

2,774,813

ELECTROLUMINESCENT TELEVISION PANEL

Donald C. Livingston, Bayside, N. Y., assignor to Sylvania Electric Products Inc., a corporation of Massachusetts Application November 1, 1955, Serial No. 544,152
11 Claims. (Cl. 178—5.4)

My invention is directed toward electroluminescent image display devices.

Certain types of phosphors, when under the influence of an externally applied electric field, will luminesce, the intensity of the emitted light being some function of the strength of this applied field. Consequently, films or layers formed from such phosphors can be used as transducers for transforming electrical energy to light energy. Phosphors of this type are said to be electroluminescent.

It is known that first and second mutually orthogonal (for example, horizontal and vertical) arrays of parallel, separated electrical conductors can be positioned on each side of such a film or layer to form a crossed-grid structure wherein a portion of the film (defined as a cell) is connected between one horizontal conductor and one vertical conductor. When a suitable electric potential difference is applied between any one horizontal-vertical conductor pair, the cell connected between this pair will luminesce.

Further, it has been proposed to switch or commutate these applied potentials in such manner as to successively energize each cell in turn, thus producing an effect analogous to the cathode ray tube scanning operation as developed in a conventional television receiver. Therefore, it appears theoretically possible to produce a flat electroluminescent panel which can be used as a replacement for a cathode ray tube in a television receiver.

Electroluminescent panels of the type described above exhibit spurious effects, which I define as cross effect. This effect must be overcome before a commercially successful panel can be produced. This effect is produced in the following manner. When a positive potential of +V is applied to a selected horizontal conductor and a negative potential of —V is applied to a selected vertical conductor, all other conductors being held at zero or ground potential, a potential difference of 2V is established between the two selected conductors, and the electroluminescent cell connected between these two conductors will luminesce brightly. However, a potential difference of V is established between all unselected conductors in one array and the selected conductor of the other array, and the cells connected between these conductors will luminesce dimly. Of course, a zero potential difference is maintained between all unselected horizontal and vertical conductors, and the cells connected between these unselected conductors will not luminesce.

Thus, the single cell which luminesces brightly is energized the desired manner; the cells which luminesce dimly are energized because of side effects inherent in the crossed-grid structure and produce a spurious luminescent pattern in the shape of a cross.

It is an object of the present invention to improve electroluminescent devices in such manner that this spurious cross effect is eliminated.

Another object is to provide a new and improved electroluminescent panel characterized by the absence of the cross effect.

Still another object is to eliminate the cross effect in electroluminescent devices of the crossed-grid type by preventing current flow through all cells other than the particular cell which is to be energized.

These and other objects of my invention will either be explained or will become apparent hereinafter.

In my invention there is provided a thin electroluminescent layer or film interposed between first and second arrays of parallel separated electrical conductors. The first array conductors are positioned at some angle other than 0° with respect to the second array conductors. For purposes of simplicity, this angle is normally chosen to be 90°, and the conductors in one array are positioned horizontally while the conductors in the other array are positioned vertically. Therefore, it is to be understood that when the terms horizontal and vertical are used hereinafter, it is not intended to restrict the structure to mutually perpendicular conductors; obviously other angular orientations can be used.

The phosphor layer is electrically connected to the first array conductors, for example, the horizontal conductors. Further each horizontal conductor passes over each vertical conductor to form a cross-over point thereat. Individual rectifier layers are associated with each cross-over point, each layer being electrically connected between the film and the second array conductor, for example, a vertical conductor, which is associated with the same cross-over point to form a rectifier therewith.

I further provide switching or commutation means coupled between the conductors in both arrays and responsive to an incoming electrical signal to selectively energize the portion of the film in the region about each cross-over point (which I define as a cell) in a predetermined sequential pattern and at the same time to maintain all cells other than the selected cell in a deenergized state. This action is accomplished by biasing the rectifier associated with the selected cell to conduct in its forward or low resistance direction, and, at the same time, biasing all other rectifiers in the backward or high resistance direction to an extent at which appreciably no current flows therethrough.

It will be apparent that in this arrangement no cross effect can be produced.

An illustrative embodiment of my invention will now be described with reference to the accompanying drawings wherein.

Figure 1:
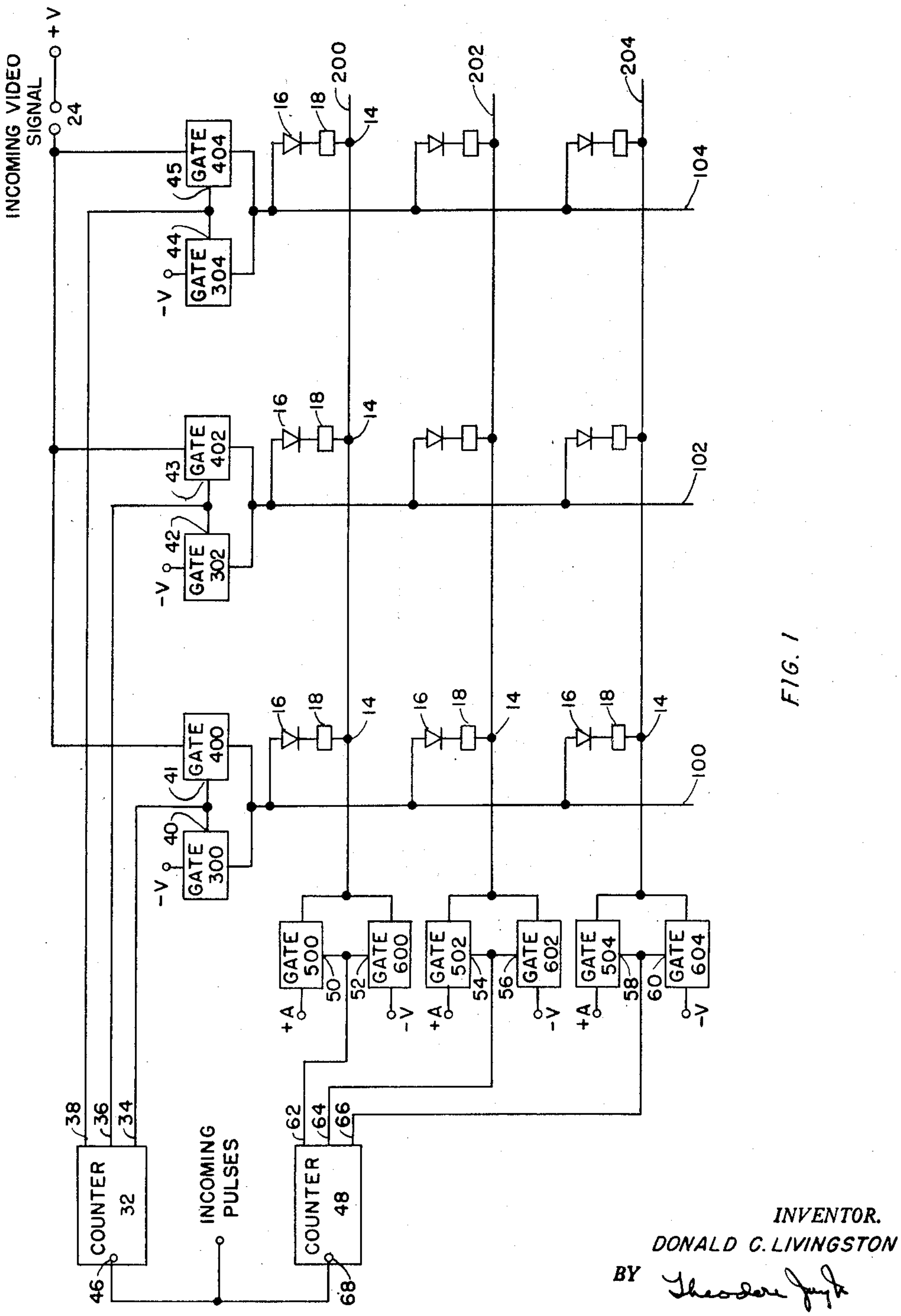
Fig. 1 is a schematic diagram of this embodiment.

Referring now to Fig. 1, there is provided a plurality of parallel separated vertical electrical conductors 100, 102, 104 (in this example three conductors) which form the first array, and a plurality of parallel separated horizontal electrical conductors 200, 202, 204 which form the second array.

Each vertical conductor 100, 102, 104 crosses over each horizontal conductor 200, 202, and 204 to form cross-over points 14. A circuit including in series connection a rectifying element 16 and a portion of an electroluminescent film (i. e. a cell) 18 is connected at each cross-over point between the horizontal vertical conductor pair which defines the said each cross-over point.

All vertical conductors 100, 102 and 104 are connected through corresponding normally open gates 300, 302 and 304 to a point of negative potential, for example —V, and through corresponding normally closed gates 400, 402 and 404 and terminals 24 to a point of positive potential, for example +V. (All potentials are taken with reference to some arbitrary reference potential as, for example, ground or 0.)

All horizontal conductors 200, 202, 204 are connected through corresponding normally open gates 500, 502, 504 to a point of positive potential, for example +A, and through corresponding normally closed gates 600, 602 and 604 to a point of negative potential −V. Rectifying elements 16 are poled in such manner that when the normally open gates associated with any selected pair of horizontal and vertical conductors are open, the element connected therebetween is back-biased and will not conduct appreciable current (or indeed can be completely non-conductive).

A positive going video signal is applied between terminals 24. As will become more apparent hereinafter, when this signal is supplied to any vertical conductor, it is superimposed upon a positive potential of +V. This positive potential is chosen to bias the element in the circuit connected to the said any conductor in such manner that any arbitrarily small signal will cause the element to conduct heavily. The potential +A is chosen to exceed the sum of the potential +V and the maximum potential of the video signal to insure that all the rectifying elements will remain back-biased as the video signal increases to its maximum value.

A counter 32 is provided with a plurality of output leads (in this example three leads) 34, 36 and 38 which are connected respectively to the conditioning electrodes 40—41, 42—43 and 44—45, of gates 300, 400, gates 302, 402, and gates 304, 504. This counter is controlled in accordance with incoming pulses (as for example the horizontal synchronization pulses carried by a television signal) which are supplied to the input 46 of the counter. Counter 32 is so constructed that upon the arrival of an incoming pulse, output pulses appear successively at leads 34, 36, and 38. Upon the appearance of an output pulse, the normally open gate which receives this pulse is closed, and the associated normally closed gate is opened. (When the output pulse disappears, these gates automatically return to their normal states.) The internal time constants of the counter are so arranged that in the period between successive incoming pulses, each pair of gates 300, 400, and 302, 402, etc. are successively actuated in this manner. Thus, if the incoming video signal is a conventional television signal, during any line interval, the normally closed and open gates associated with each vertical conductor are successively opened and closed and the incoming signal is supplied to those conductors in turn. This action is the equivalent of one horizontal line scanning operation in a conventional cathode ray tube.

A second counter 48 has three output leads 62, 64, 66 respectively connected to the conditioning electrodes 50—52, 54—56, 58—60 of gates 500, 600, gates 502, 602, and gates 504, 604. Counter 48 is likewise controlled by the same incoming pulses supplied to counter 32. These pulses are supplied to the input 68 of counter 48. Counter 48 is so constructed that upon the arrival of one incoming pulse, an output pulse appears on lead 62; upon the arrival of the next incoming pulse, an output pulse appears on lead 64; upon the arrival of the next incoming pulse, an output pulse appears on lead 66. The operation of the gates associated with counter 48 is identical with that of the gates associated with counter 32.

However, the internal time constants of counter 48 are so chosen that upon the arrival of one incoming pulse a normally open gate is closed and a normally closed gate is opened; both gates remain in this condition until the arrival of the next incoming pulse.

Both counters are so constructed as to return to their original position after output pulses have appeared at all counter output leads.

The operation of the entire system then proceeds as follows. A video signal carrying synchronizing pulses appears across terminal 24. The synchronization pulses are extracted from the signal in conventional manner (not shown) and supplied to the inputs 46 and 68. Upon the arrival of one synchronization pulse, gate 500 is closed and gate 600 is opened. At the same time, gate 300 is closed and gate 400 is opened. The video signal superimposed upon a positive potential of +V then causes the element 16 associated with the cross-over point between conductors 100 and 200 to conduct and the associated electroluminescent cell 18 luminesces to an extent dependent upon the magnitude of the video signal. All other diodes are heavily back biased and cannot conduct. After a short interval determined by the internal time constants of counter 32, gates 300 and 400 return to their normal states; gate 302 is closed and gate 42 reopened. The element associated with conductors 100 and 200 is then rendered non-conductive and the diode associated with conductor 102 at 200 is rendered conductive. This process proceeds until all the cells 18 connected between conductors 100, 102, 104 and 200 have been successively energized and deenergized, and the next synchronization pulse appears.

At this point, gate 502 is opened, gate 600 is closed, and gate 602 is closed and gate 600 is opened. The same process is repeated until the cells 18 connected between conductors 100, 102, 104 and 202 have been successively energized and deenergized. It will be seen that all cells can then be selectively energized in a manner analogous to the cathode ray tube scanning operation.

The counters and gates are well known components and are shown only in block form. For example, counter 48 can be a ring counter incorporating successive stages of bi-stable multivibrators or flip-flops, and counter 32 can incorporate successive stages of monostable multivibrators, each of which, when returning from the unstable to the stable state, triggers the next monostable circuit into the unstable state.

Figure 2:
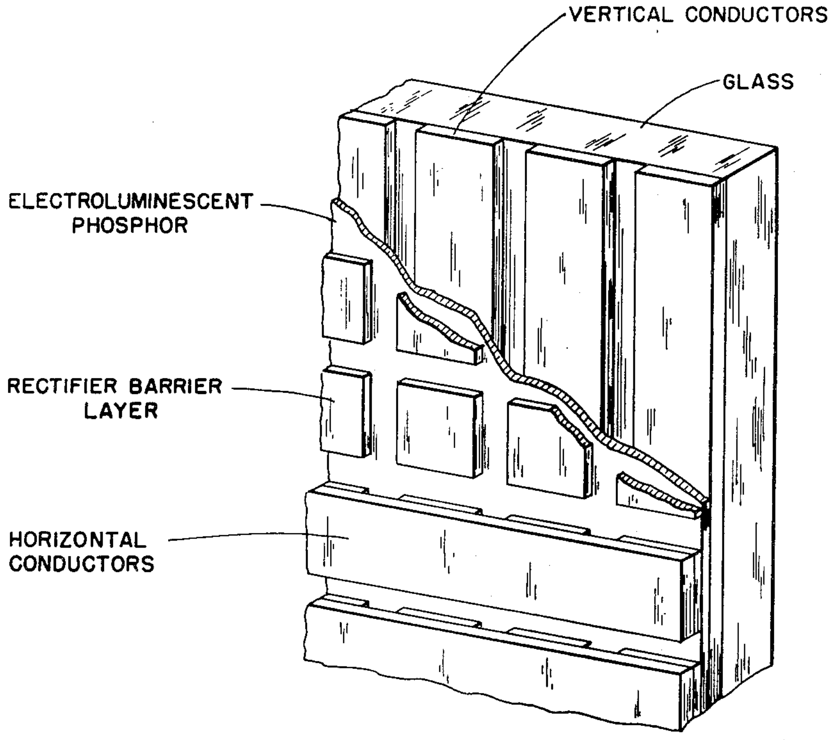
Figs. 2 and 3 are different sectional views of the electroluminescent panel incorporated in this embodiment.
Figure 3:
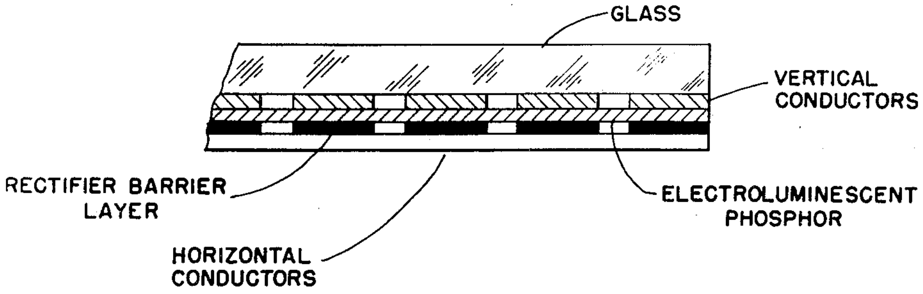

Referring now to Figs. 2 and 3, there is provided a glass plate upon which is deposited the transparent vertical conductor strips. These strips can be prepared from such materials as tin oxide, stannous chloride, and titanium dioxide using techniques well known to the art.

A film of electroluminescent phosphor is deposited over the vertical strips. This layer may consist of a crystalline film as described in U. S. Patent No. 2,685,530 or can be a dielectric suspension of phosphor particles as described in copending patent application Serial No. 306,909, filed August 28, 1952, by Norman L. Harvey, or Serial No. 306,800, filed August 22, 1951, by William K. Squires, both applications being assigned to the assignee of the present application.

A mosaic of individual rectifying film areas or blocks is deposited over the phosphor film. These rectifying areas are of the barrier layer type and are formed from such materials as copper oxide, silicon, germanium or titanium oxide and deposited by methods well known to the art. These layers are insulatedly spaced apart from each other. The horizontal conductor strips are then deposited over the rectifying layers to form rectifiers therewith. These horizontal strips can be, for example, formed from vacuum deposited aluminum strips; of course other metals and deposition techniques are available.

The entire structure is so formed that a series circuit comprising a rectifying area and an appropriate portion of the phosphor film is connected between each pair of horizontal and vertical conductors.

It will be apparent that the rectifiers can be deposited in the form of an unpartitioned film which can then be ruled or otherwise partitioned into separate layers or films. Further, when the voltages applied are sufficiently large to exceed the breakdown voltage of the rectifying film, additional rectifier films may be applied thereover to produce a plurality of series connected rectifiers (poled in the same sense) connected between each pair of horizontal and vertical conductors. This series connection can be so designed as to withstand a breakdown voltage of any value desired. Moreover, when the rectifying film is formed from a transparent material, it can be interposed between the vertical conductors and the phosphor layer instead of being placed between the vertical conductors and the phosphor layer. Indeed, if the conductors are formed from very thin wires, sufficient light emission can be produced even though all such wires are not transparent.

A phosphor film will not luminesce until a minimum or threshold potential difference is applied between the surfaces of the film. This difference, of course, varies with the type of phosphor. Accordingly, the various biasing potentials must have values selected in accordance with the characteristics of the particular phosphor used.

Furthermore, when the threshold difference is sufficiently small that any arbitrarily small video signal can exceed this difference, it will be obvious that gates 400, 402, and 404 can be eliminated. More specifically, the video signal can be supplied to all vertical conductors simultaneously, as long as the potential difference applied across all rectifier elements which are to be back-biased is sufficiently high to maintain these elements substantially non-conductive in the presence of the video signal, when this signal attains its maximum permissible value.

While I have shown and pointed out my invention as applied above, it will be apparent to those skilled in the art, that many modifications can be made within the scope and sphere of my invention in the claims which follow.

What is claimed is:

1. In combination, a first array of parallel, separated electrical conductors extending along a first direction; a second array of parallel separated electrical conductors extending along a second and non-parallel direction, each conductor in the first array passing over all conductors in the second arary to define a plurality of cross-over points therewith; an electroluminescent phosphor film interposed between said arrays to establish direct electrical contact between said film and the conductors in one of said arrays; and a rectifying layer of the barrier type deposited on said film and connected to the conductors in the other array, said layer being divided into a like plurality of insulatedly separated barrier layer elements respectively positioned at each cross-over point, each element together with its corresponding other array conductor constituting a rectifier, whereby each conductor in said first array is electrically connected through a rectifier and said film to each conductor in said second array.

2. The combination as set forth in claim 1 wherein said rectifiers are all poled in the same direction, said combination further including means coupled between the conductors in both arrays to selectively render a selected one of said rectifiers heavily conductive and to simultaneously render all other rectifiers substantially non-conductive.

3. In combination, first and second arrays of parallel separated electrical conductors, the first array conductors being oriented perpendicularly to the second array conductors, each first array conductor passing over each second array conductor in said second array to define a cross-over point thereat; an electroluminescent film positioned between said arrays and electrically connected to the first array conductors; and a semiconductor layer deposited on said film and connected to the second array conductors, said layer being formed from a plurality of insulatedly separated layer elements, one element being positioned at each cross-over point and electrically connected between said film and the second array conductor associated with said each point.

4. In combination, a first array provided with a first plurality of parallel, separated electrical conductors; a second array provided with a second plurality of parallel, separated electrical conductors oriented at a fixed angle other than 0° with respect to the conductors in said first array, each first array conductor crossing over each second array conductor to define a cross-over point thereat, the number of said points being equal to the numerical product of said first and second pluralities; a like third plurality of electric circuits, each circuit being associated with a corresponding cross-over point and being electrically connected between the particular first and second array conductors which form said corresponding point, each circuit including, in serial connection, at least one rectifying layer of the barrier type and an electroluminescent layer, each layer being in direct contact with one of the conductors associated with said each circuit thus forming a rectifier, all rectifiers being poled in the same sense.

5. The combination as set forth in claim 4 further including means coupled to the conductors in both arrays to apply a potential difference of given polarity between a selected first array conductor and a selected second array conductor to condition the rectifier coupled between said selected conductors for conduction in its low resistance direction and simultaneously to apply a potential difference of opposed polarity between all other first and second array conductors to render all other rectifiers substantially non-conductive.

6. The combination as set forth in claim 5 further including means to apply a signal between the two selected conductors to cause the film in the region of the cross-over point defined by the selected conductors to luminesce to an extent dependent upon the magnitude of said signal.

7. In combination, first and second arrays of parallel separated electrical conductors, the first array conductors being oriented at a fixed angle other than 0° with respect to the second array conductors, each first array conductor crossing over each second array conductor to define a cross-over point thereat, the cross-over points defined by all first array conductors and any one second array conductor constituting a set of cross-over points, the number of sets corresponding to the number of said second array conductors; an electric circuit associated with each point and interconnecting the first and second array conductors defining said each point, said circuit including in serial connection a rectifying layer of the barrier type and an electroluminescent layer, said layer being in direct contact with one of the conductors connected to said circuit and forming a rectifier with said one conductor.

8. The combination as set forth in claim 7 further including means coupled between said conductor arrays to first render the rectifiers associated with the cross-over points in any one set successively conductive while rendering all other rectifiers non-conductive and then to repeat this process in turn with the rectifiers associated with each of the remaining sets of cross-over points.

9. An electroluminescent device comprising a first array of horizontally disposed, separated, parallel, electrical conductors; a second array of vertically disposed, separated, parallel electrical conductors, each vertical conductor crossing over each horizontal conductor at a point defined as a cross-over point, there being a plurality of such points, an electroluminescent layer interposed between said arrays and electrically connected to all conductors in one of said arrays; and a like plurality of rectifying layers of the barrier type, each layer being electrically connected at a corresponding cross-over point between said film and the particular conductor in the other array associated with said corresponding point to form a rectifier with said particular conductor, all rectifiers being poled in the same sense.

10. A device as set forth in claim 9 further including first switching means coupled to the second array and responsive to incoming equidistantly spaced pulses to supply a voltage having a first polarity to successive vertical conductors in accordance with successive pulses, said first means simultaneously supplying a voltage having a second opposite polarity to all other vertical conductors; and second switching means coupled to said first array and responsive to said pulses to supply a voltage having the second polarity to each horizontal conductor in succession upon the arrival of each pulse, said second means simultaneously supplying a voltage having the first polarity to all other horizontal conductors, said voltage polarities being so chosen with respect to the poling sense of said rectifiers that all rectifiers other than the particular rectifier connected between the vertical conductor supplied with the first polarity voltage and the horizontal conductor supplied with the second polarity voltage are strongly back-biased and non-conductive.

11. A device as set forth in claim 10 further including means to supply a video signal having said first polarity to the vertical conductor supplied with the first polarity voltage to render said particular rectifier heavily conductive and to thereby cause the electroluminescent layer in the region about the cross-over point associated with said particular rectifier to luminesce to an extent dependent upon the magnitude of said signal.

No references cited.